US006084078A

United States Patent [19]

Mennicke

[11] Patent Number: 6,084,078

[45] Date of Patent: *Jul. 4, 2000

[54] DISAZO DYESTUFFS FOR DYEING CELLULOSIC MATERIALS

[75] Inventor: Winfried Mennicke, Leverkusen, Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,286

[22] Filed: Dec. 17, 1997

[30] Foreign Application Priority Data

Dec. 24, 1996 [DE] Germany .......................... 196 54 430

[51] Int. Cl.[7] .......................... C09B 31/08; C09B 67/26

[52] U.S. Cl. .......................... 534/670; 534/728; 534/829; 534/836; 8/527; 8/437; 8/681; 8/919

[58] Field of Search .......................... 534/670, 728, 534/829, 836; 8/527

[56] References Cited

U.S. PATENT DOCUMENTS 593,347 11/1897 Bender .......................... 534/836
1,849,572 3/1932 Gyr .......................... 534/836
4,077,767 3/1978 Bleck et al. .......................... 8/436
5,288,294 2/1994 Käser .......................... 8/687
5,580,965 12/1996 Jäger .......................... 534/829

FOREIGN PATENT DOCUMENTS 0 534 903 A1 3/1993 European Pat. Off. .
0 735 106 A2 1/1996 European Pat. Off. .
689 111 9/1930 France .
24 49 206 4/1976 Germany .
59-176368 3/1983 Japan .
144 485 12/1930 Switzerland .

*Primary Examiner*—Fiona T. Powers
*Attorney, Agent, or Firm*—Norris, McLaughlin & Marcus, P.A.

[57] ABSTRACT

The novel disazo dyestuffs of the formula (I)

(I)

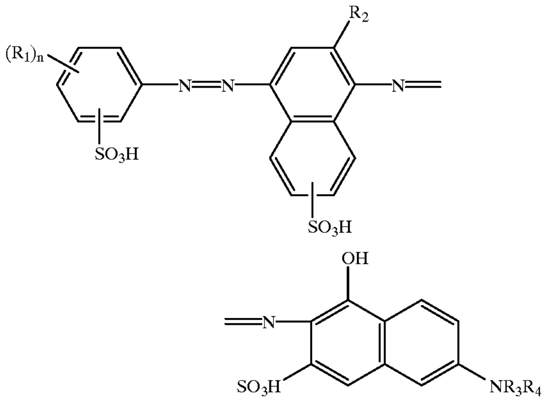

in which the substituents and indices have the meanings given in the description, are outstandingly suitable for dyeing cellulosic materials in red-violet to blue brilliant color shades.

19 Claims, No Drawings

DISAZO DYESTUFFS FOR DYEING CELLULOSIC MATERIALS

The present invention relates to novel disazo dyestuffs, a process for their preparation, solutions thereof, a process for the preparation of the solutions and the use thereof for dyeing and printing polymeric materials, in particular cellulosic materials.

The novel disazo dyestuffs correspond to the formula (I)

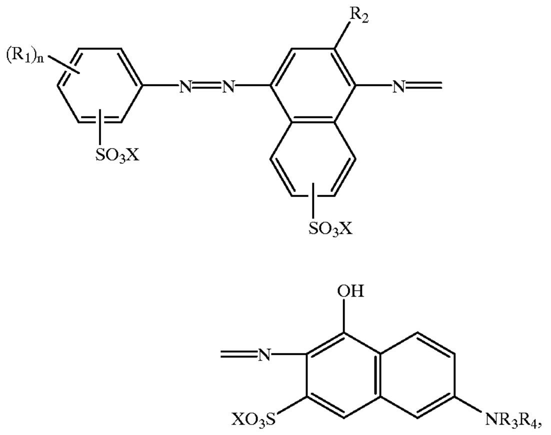

in which $R_1$ represents $C_1$–$C_4$-alkyl, $R_2$ represents hydrogen, $C_1$–$C_4$-alkyl or $C_1$–$C_4$-alkoxy, $R_3$ represents hydrogen or $C_1$–$C_4$-alkyl, $R_4$ represents hydrogen, $C_1$–$C_4$-alkyl, optionally substituted phenyl or acyl, X represents a hydrogen, alkali metal or ammonium ion or represents the cation of an organic amine and n represents an integer from 1 to 3.

The cations X in formula (I) can be identical or different, and are preferably identical. Possible alkali metal ions in the meaning of X are preferably lithium, sodium and potassium ions, and possible cations of organic amines are, in particular, the mono-, bis-, tris- and tetra-$C_1$–$C_4$-alkylammonium ions, the mono-, bis- and tris-$C_1$–$C_4$-alkanolammonium ions and/or mixed forms thereof.

Optionally substituted phenyl in the meaning of $R_4$ is to be understood as meaning phenyl which is substituted one or more times, preferably once to four times by identical or different substituents, possible substituents being $C_1$–$C_4$-alkyl, $C_1$–$C_4$-alkoxy, halogen, such as, for example, chlorine- or bromine, sulfo, carboxyl, hydroxyl, amino, amino which is mono- or disubstituted by $C_1$–$C_4$-alkyl, acylamino, for example formylamino, $C_1$–$C_4$-alkanoylamino, benzoylamino or benzoylamino which is substituted by $C_1$–$C_4$-alkyl, $C_1$–$C_4$-alkoxy, chlorine or bromine.

Acyl in the meaning of $R_4$ is to be understood as meaning, for example, aminocarbonyl, formyl, $C_1$–$C_4$-alkanoyl, benzoyl or benzoyl which is substituted by $C_1$–$C_4$-alkyl, $C_1$–$C_4$-alkoxy, chlorine or bromine.

Preferably,

X represents a cation of the formula $$R_5\text{—}\overset{\oplus}{N}(R_6)_3,\quad R_5\text{—}\overset{\oplus}{N}H(R_6)_2 \quad \text{or} \quad (R_5)_2\overset{\oplus}{N}H\text{—}R_6$$

in which $R_5$ represents hydrogen or $C_1$–$C_4$-alkyl which is optionally substituted by hydroxyl or hydroxy-$C_1$–$C_4$-alkoxy, in particular represents $CH_3$, $C_2H_5$, $CH_2$—$CH_2$—$CH_2$—$CH_3$, $CH_2$—$CH_2$—OH, $CH_2$—CH(OH)—$CH_3$ or $CH_2$—$CH_2$—$OCH_2$—$CH_2$—OH and $R_6$ represents $C_1$–$C_4$-hydroxyalkyl, $C_1$–$C_4$-hydroxyalkoxy-$C_1$–$C_4$-alkyl or hydroxy-poly($C_1$–$C_4$-alkoxy)-$C_1$–$C_4$-alkyl having up to 6 $C_1$–$C_4$-alkoxy units, in particular represents $CH_2$—$CH_2$—OH, $CH_2$—CH(OH)—$CH_3$, $CH_2$—$CH_2$—$OCH_2$—$CH_2$—OH or OH or 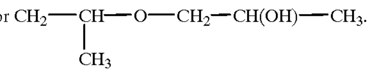

Compounds which are of particular importance because of their good dyeing properties are those of the formula (II)

(II)

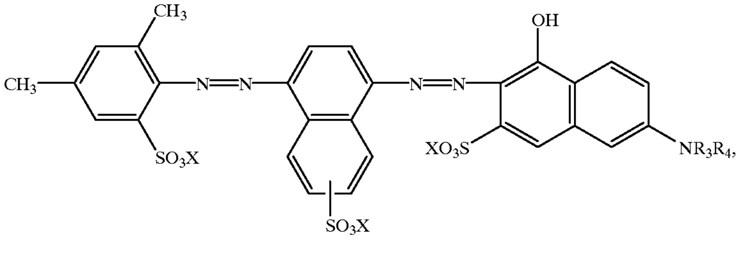

in which $R_3$, $R_4$ and X have the abovementioned meaning.

The cations X in formula (II) can be identical or different, and are preferably identical.

The dyestuffs of the formula I according to the invention can be obtained by diazotizing the aminobenzenesulfonic acids of the formula (III)

(III)

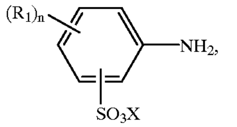

in which $R_1$, X and n have the abovementioned meaning, and coupling the diazotization products to the aminonaphthalenesulfonic acids of the formula (IV)

(IV)

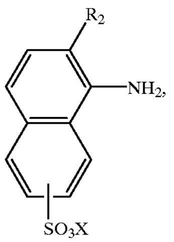

in which $R_2$ and X have the abovementioned meaning, diazotizing the aminoazo dyestuffs formed in this reaction, of the formula (V)

(V)

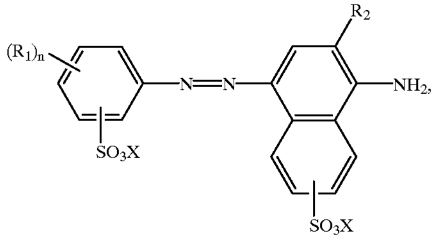

in which $R_1$, $R_2$, X and n have the abovementioned meaning, and coupling the diazotization products to the aminonaphtholsulfonic acids of the formula (VI)

(VI)

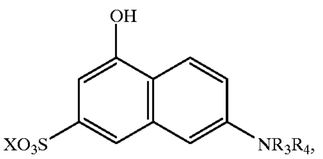

in which $R_3$, $R_4$ and X have the abovementioned meaning.

Suitable aminobenzenesulfonic acids of the formula III (X=H) are, for example:

2-amino-3-methyl-, -3-ethyl- or -3-propyl-benzenesulfonic acid,
2-amino4-methyl- or -4-propyl-benzenesulfonic acid,
2-amino-5-methyl-, -5-ethyl-, -5-propyl- or -5-butyl-benzenesulfonic acid,
2-amino-6-methyl-benzenesulfonic acid,
2-amino-3,4-, -3,5-, -3,6-, 4,5- or 4,6-dimethyl-benzenesulfonic acid,
2-amino-4-methyl-5-isopropyl- or -5-isopropyl-4-methyl-benzenesulfonic acid,
2-amino-3,5,6-trimethyl-benzenesulfonic acid,
3-amino-2-methyl-benzenesulfonic acid,
3-amino-4-methyl- or -4-ethyl-benzenesulfonic acid,
3-amino-5-methyl-benzenesulfonic acid,
3-amino-6-methyl-, -6-ethyl- or -6-butyl-benzenesulfonic acid,
3-amino-2,4-, -2,5-, -2,6-, -4,5-, -4,6- or -5,6-dimethyl-benzenesulfonic acid,
3-amino-2-methyl-4-isopropyl-benzenesulfonic acid,
3-ainino-2,4,6-trimethyl-benzenesulfonic acid,
4-amino-2-methyl-benzenesulfonic acid,
4-amino-3-methyl- or -3-ethyl-benzenesulfonic acid,
4-amino-2,3-, -2,5-, -2,6- or -3,5-dimethyl-benzenesulfonic acid and
4-amino-2-isopropyl-5-methyl-benzenesulfonic acid.

Possible aminonaphthalenesulfonic acids of the formula IV (X=H) are:

1-aminonaphthalene-6- or -7-sulfonic acid,
1-aminonaphthalene-2-methyl-6- or -7-sulfonic acid and
1-aminonaphthalene-2-methoxy-6- or -7-sulfonic acid.

Possible examples of aminonaphtholsulfonic acids of the formula VI (X=H) are:

1-hydroxy-7-amino-, -7-methylamino-, -7-dimethylamino-, -7-phenylamino-, -7-(4-sulfophenylamino)-, -7(3-sulfophenylamino)-, -7-(4-carboxyphenylamino)-, -7-(3-carboxyphenylamino)-, -7-(4-hydroxy-3-carboxyphenylamino)-, -7-(4-methyl-phenylamino)-, -7-(4-methoxyphenylamino)-, -7-(2-methoxyphenylamino)-, -7-(2,4-dimethoxyphenylamino)-, -7-(4-chlorophenylamno)-, -7-(4-aminophenylamino)-, -7-(4-amino-3-sulfophenylamino)-, -7-(4-benzoylaminophenylamino)-, 7-(4-benzoylamino-3-sulfophenylamino)-, -7-(4-4'-methylbenzoylaminophenylamino)-, -7-ureido-, -7-acetamino-, -7-benzoylamino- and -7-(4-methylbenzoylamino)-naphthalene-3-sulfonic acid.

The diazotization of the aminobenzenesulfonic acids of the formula (III) and of the intermediately formed aminoazo dyestuffs of the formula (V) is carried out in a manner known per se, for example with an alkali metal nitrite, such as sodium nitrite, in a mineral acid medium, preferably in a hydrochloric acid medium, at temperatures of 0–30° C., preferably 0–15° C. The coupling of the diazotized aminobenzenesulfonic acids of the formula (III) with an aminonaphthalenesulfonic acid of the formula (IV) and the coupling of the diazotized aminoazo dyestuffs of the formula (V) with an aminonaphtholsulfonic acid of the formula (VI) is likewise carried out under customary known conditions. The coupling reaction is preferably carried out in an aaqueous medium at a weakly acid, neutral or alkaline pH and at temperatures of 0–30° C., preferably 10–25° C., a neutral to weakly acid pH, preferably in the range from 7 to 4, proving advantageous for the coupling reaction with the aminonaphthalenesulfonic acids of the formula (IV) and a neutral to weakly alkaline pH, preferably in the range from 7.5 to 9, proving advantageous for the coupling reaction with the aminonaphtholsulfonic acids of the formula (VI). The desired pH can be established and maintained by addition of bases, for example of alkali metal hydroxides, carbonates or acetates, such as lithium hydroxide, carbonate or acetate, sodium hydroxide, carbonate or acetate or potassium hydroxide, carbonate or acetate, ammonia, ammonium hydroxides of the formula (VII) or organic amines, for example the amines of the formula (VII) to (IX)

$$R_5\overset{\oplus}{N}(R_6)_3\overset{\ominus}{O}H, \quad (VII)$$

$$R_5—N(R_6)_2 \quad (VIII)$$

or $$(R_5)_2N—R_6, \quad (IX)$$

in which $R_5$ and $R_6$ have the abovementioned meaning.

The dyestuffs according to the invention prepared in this way can be isolated by salting out with alkali metal salts, spray drying or evaporation on a roll, and processed to water-soluble preparations with the customary standardizing agents and auxiliaries. They can also be worked up to give aqueous concentrated and stable solutions, with and without prior isolation, by subjecting their aqueous solutions or suspensions to a membrane separation process, in particular a pressure permeation, and freeing them from electrolytes and low molecular weight by-products in this way.

Working up of the dyestuffs according to the invention to give stable solutions is also achieved by the process of German Offenlegungsschrift 2 449 206. The principle of this process comprises two salt-to-salt conversions. Accordingly, the sodium salts of the dyestuffs according to the invention are converted into the sparingly soluble calcium salts (A) with an amount of calcium ions at least equivalent to the sulfo groups. The calcium salts (A) are separated off and then converted in an aqueous, suspension into readily soluble lithium or ammonium salts (B) and into sparingly soluble calcium sulfate by stirring with sulfates of lithium, of ammonium or of the cations $$R_5—\overset{\oplus}{N}(R_6)_3, \quad R_5—\overset{\oplus}{N}H(R_6)_2 \quad \text{or} \quad (R_5)_2\overset{\oplus}{N}H—R_6,$$

in which $R_5$ and $R_6$ have the abovementioned meaning, or by stirring with sulfuric acid and basic lithium salts, ammonia, the ammonium hydroxides of the formula (VII) or the amines of the formula (VIII) or (IX). Finally, the desired solution of the dyestuff salts (B) is obtained by filtering off the calcium sulfate which has precipitated out.

It has been found that in the case of the dyestuffs according to the invention, the conversion from sparingly soluble (A) into readily soluble (B) proceeds particularly smoothly if a 0.5- to 2-fold, preferably 0.6- to 1.2-fold excess of sulfate ions, either in the form of lithium sulfate or of one of the abovementioned ammonium sulfates or in the form of sulfuric acid, is used, based on the calcium content of (A).

The solutions of (B) are particularly readily soluble and are stable in a concentration of 10–25% by weight for several weeks if sulfuric acid and an amine of the formula (VIII) or (IX), preferably in a molar excess of up to 100% with respect to the sulfuric acid, in particular 12.5–75%, are used for their preparation. Particularly suitable amines of the formulae (VIII) and (IX) are, for example: methyldiethanolamine, ethyldiethanolamine, butyldiethanolamine, methyldiisopropanol, N,N-dimethylethanolamine, N,N-diethylethanolamine, 2-(2-diinethylaminoethoxy)ethanol, 2-(2-diethylaminoethoxy) ethanol, 2-(2-diethylaminoethoxyethoxy)ethanol.

The solutions of the dyestuffs according to the invention can also additionally comprise water-soluble organic solubilizing agents, for example urea, N,N'-di-methylurea, 6-caprolactam, methylpyrrolidone, N-methylpyrrolidone, dimethyl sulfoxide, polyhydric alcohols and $C_1$–$C_4$-monoalkyl ethers thereof, such as ethylene glycol, propylene glycol, glycerol, ethylglycol or 1-ethoxy-2-propanol, and alkanolamines, such as ethanolamine or the amines of the formula (VII). The liquid dyestuff preparations are preferably free from organic solubilizing agents and in general comprise 5 to 40% by weight, preferably 10 to 25% by weight, of at least one dyestuff of the formula (I) according to the invention.

The invention furthermore relates to the use of the disazo dyestuffs of the formula (I) for dyeing and printing polymeric materials, in particular materials containing carboxamide groups and cellulosic materials, such as leather, cotton, regenerated cellulose fibers and paper.

From the point of view of their properties, the dyestuffs (I) can be regarded as substantive or direct dyestuffs, and can therefore be used by all the processes customary for substantive dyestuffs in the leather, textile and paper industry.

In both a solid and a liquid preparation, the dyestiffs (I) are suitable, above all, for the production of papers dyed in the pulp and on the surface, sized and unsized grades of paper which can originate from bleached and unbleached cellulose from various sources, such as softwood or hardwood sulfite or sulfate cellulose, being possible. For dyeing paper in the pulp, the dyestuffs (I) are added to the paper pulp before sheet formation. This can be effected either in the thick pulp after pulping the cellulose or in the thin pulp before feeding to the papermaking machine. For dyeing paper sized in the pulp, the dyestuffs (I) are preferably added to the thin pulp before the sizing agent. For dyeing paper in the surface, they are preferably dissolved in a concentrated starch solution and applied to the paper in this form by means of a sizing press. The dyestuffs (I) can also be employed in immersion dyeing of paper.

The dyestuffs of the formula (I) according to the invention give red-violet to blue brilliant dyeings of good wet and light fastnesses on the abovementioned materials, preferably on paper. The dyed papers have good bleaching properties. They are insensitive to alum and largely insensitive to pH and are resistant not only to water but also to milk, fruit juices and alcoholic drinks.

EXAMPLE 1

23.36 g of 85.9% pure 2-amino-3,5-dimethyl-benzenesulfonic acid are dissolved in 250 ml of hot water of 65° C. 23 ml of 4.35 N sodium nitrite solution are added to the solution and the mixture is discharged onto a mixture of 120 ml of water, 70 g of ice and 28 ml of 10 N hydrochloric acid in the course of 20 minutes, the temperature being kept below 20° C. by occasional addition of ice. The diazofization reaction has ended 30 minutes later. 25.8 g of 86.4% pure 1-aminonaphthalene-7-sulfonic acid are dissolved in about 10 ml of 10 N sodium hydroxide solution, and 54.4 g of Na acetate-$3H_2O$ are added. The suspension of the diazotization is pumped in the course of one hour into the suspension which is established, during which the temperature is also kept below 20° C. After about 12 hours, when the coupling reaction has ended, the monoazo dyestuff of the formula

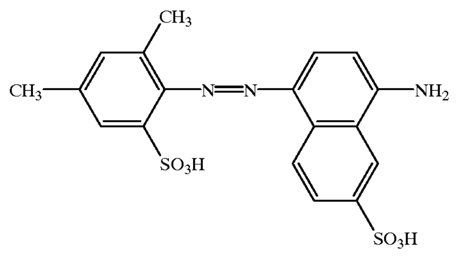

is filtered off with suction. The paste obtained by this procedure is stirred into 300 ml of water, for further processing, and, after addition of 16 ml of 10 N hydrochloric acid, is diazotized with 21 ml of 4.35 N sodium nitrite solution at pH <2.5. The diazo suspension prepared in this way is then pumped in a uniform flow onto a mixture of 28.7 g of 98.9% pure 1-hydroxy-7-phenylamino-naphthalene-3-sulfonic acid, 150 ml of water, 9 ml of 10 N sodium hydroxide solution and 16 g of $NaHCO_3$. The mixture is subsequently stirred at pH 7–8 for a further hour and the dyestuff of the formula

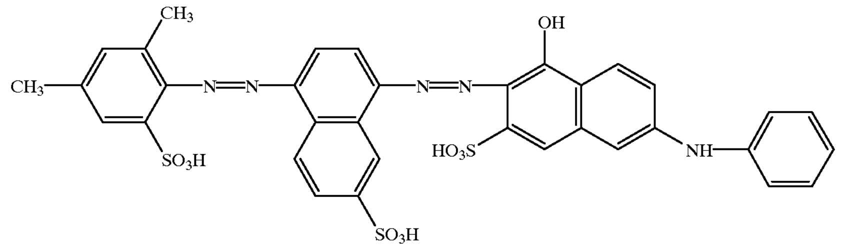

is filtered off with suction. In the dried state, it is a black powder which dyes cotton and paper in violet shades having good general fastness properties.

EXAMPLE 2

If 27.1 g of 82.4% pure 1-aminonaphthalene-6-sulfonic acid is used instead of the 25.8 g of 86.4% pure 1-aminonaphthalene-7-sulfornic acid of Example 1 and the procedure is otherwise as described in Example 1, the dyestuff of the formula

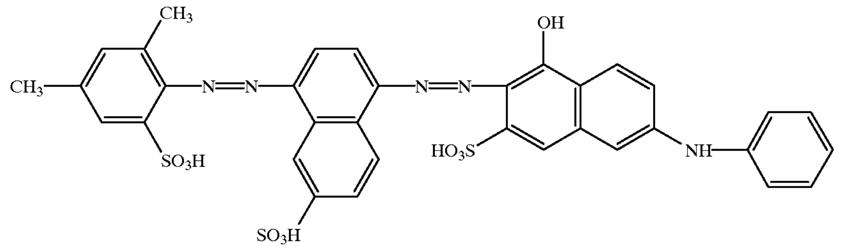

which likewise dyes cotton and paper in violet shades, is obtained.

To prepare a solution, 307.5 g of the moist paste having a dyestuff content of 24.75% (molecular weight 761) are stirred in 800 ml of water together with 19.4 g of calcium chloride for 10 hours. The solid is then filtered off with suction to give 205 g of a press-cake which contains 0.16 mol of calcium ions. The press-cake is again beaten into 440 ml of water and, after addition of 92.7 g of 6-caprolactam, 62.7 g of 50% strength by weight sulfuric acid and 57.2 g of N-methyldiethanolamine, the mixture is stirred for 5 hours. After the calcium sulfate which has precipitated out has been separated off, a concentrated dyestuff solution which is stable for several weeks is obtained.

EXAMPLES 3 to 43

The disazo dyestuffs shown in the following Tables 1 to 4 were prepared in a manner analogous to Example 1:

TABLE 1
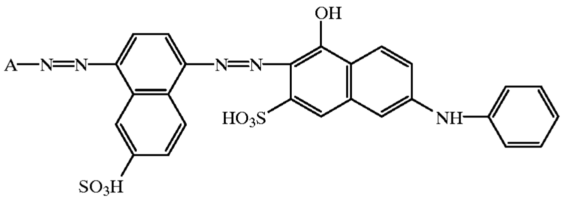
| Example No. | A |
|---|---|
| 3 | 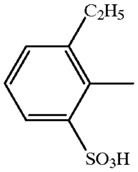 |
| 4 | 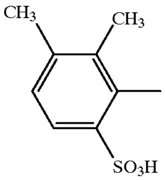 |
| 5 | 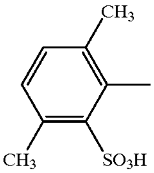 |
| 6 | 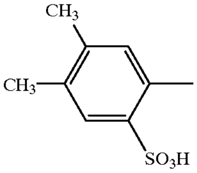 |
| 7 | 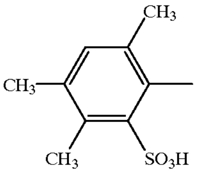 |
| 8 | 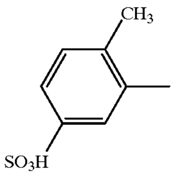 |
| 9 | 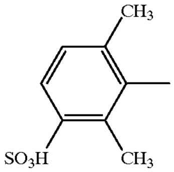 |
TABLE 1-continued
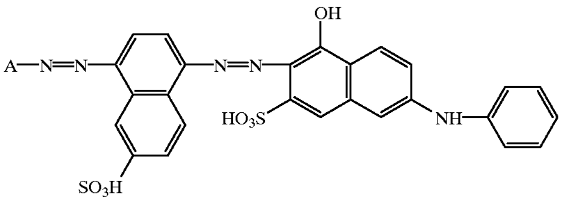
| Example No. | A |
|---|---|
| 10 | 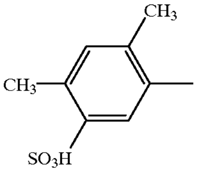 |
| 11 | 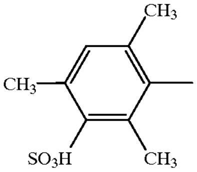 |
| 12 | 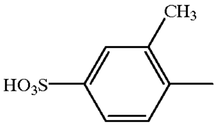 |
| 13 | 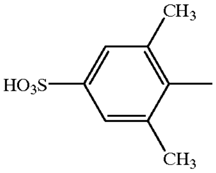 |
TABLE 2
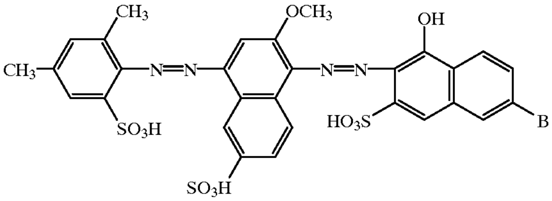
| Example No. | B |
|---|---|
| 14 | —$NH_2$ |
| 15 | 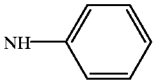 |

TABLE 3
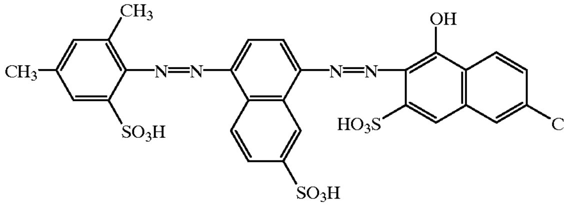
| Example No. | C |
|---|---|
| 16 | $—NH_2$ |
| 17 | 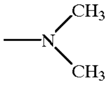 |
| 18 | $—NH—CO—NH_2$ |
| 19 | 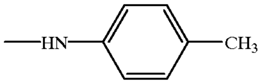 |
| 20 | 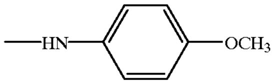 |
| 21 | 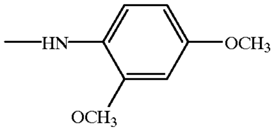 |
| 22 | 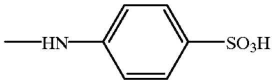 |
| 23 | 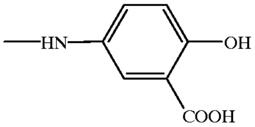 |
| 24 | 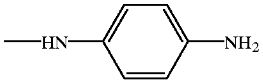 |
| 25 | 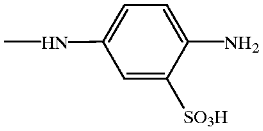 |
| 26 | 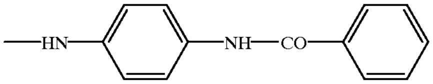 |
| 27 | 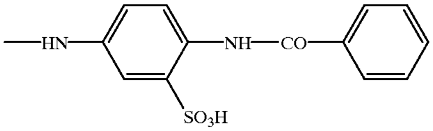 |
TABLE 3-continued
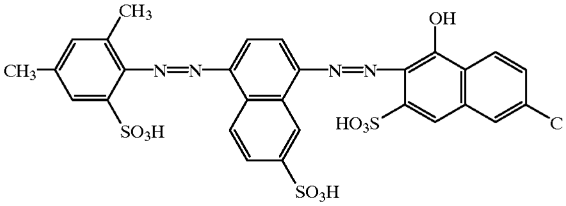
| Example No. | C |
|---|---|
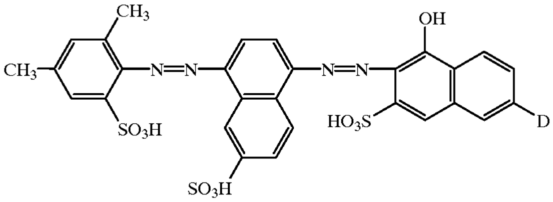
TABLE 4
| Example No. | D |
|---|---|
| 28 | $—NH_2$ |
| 29 | 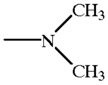 |
| 30 | 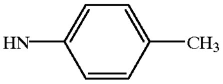 |
| 31 | $—HN—CO—NH_2$ |
| 32 | $—HN—COCH_3$ |
| 33 | 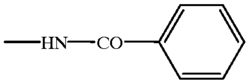 |
| 34 | 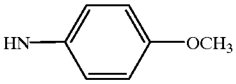 |
| 35 | 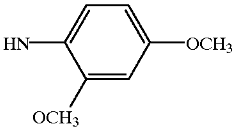 |
| 36 | 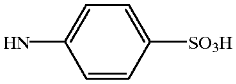 |
| 37 | 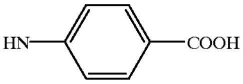 |

TABLE 4-continued

| Example No. | D |
|---|---|
| 38 | 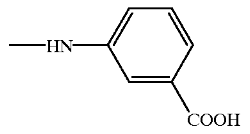 |
| 39 | 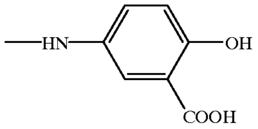 |
| 40 | 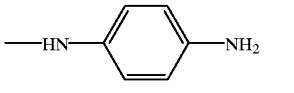 |
| 41 | 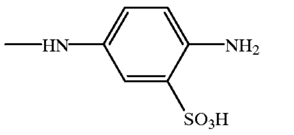 |
| 42 | 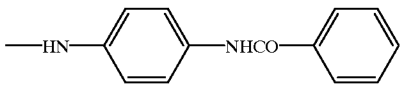 |
| 43 | 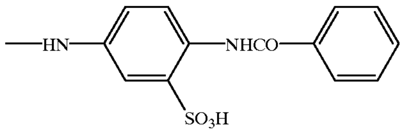 |

Dyeing Example 1

10 g of cotton yarn are introduced at 40° C. into a bath of 250 ml of water, 0.2 g of sodium carbonate, 4 g of sodium sulfate and 0.15 g of the dyestuff prepared according to Example 1. The temperature of the dye liquor is increased to 95° C., with consant agitation of the yarn, and dyeing is carried out at this temperature for 45 minutes, until the residual liquor is only weakly colored. The dyed yarn is then wrung out, rinsed out with cold and dried at 60° C. It is dyed deep violet and is distinguished by a good fastness to washing and perspiration.

Dyeing Example 2

800 kg of bleached sulfate cellulose and 200 kg of bleached sulfite cellulose are pulped with 14 cbm of industrial water in a pulper for 30 minutes until free from specks. The pulp is then transferred to an emptying vat, beaten with hollanders to a freeness of 25° SR (Schopper-Riegler), and finally enters a mixing vat, where 250 kg of kaolin Ia and 1% of dyestuff of Example 2 as an aqueous solution of 20 g/l are also added, and, after a heating-up time of 15 minutes, also 2% of rosin size and 10 minutes later 4% of alum are added. The percent content of dyestuff, rosin size and alum is in each case based on the absolutely dry fiber. The pH of the mixture is 5.3. The cellulose suspension is then processed to paper on a papermaking machine by a process customary in the industry. A printing paper which is dyed an intense violet and has good resistance to sodium carbonate solution, acetic acid, water and alcohol is obtained. The waste water is practically colorless.

Dyeing Example 3

1000 kg of bleached sulfate cellulose are pulped and beaten as described under Dyeing Example 2.1% of a fixing agent and 1% of dyestuff of Example 2 in the form of an aqueous solution of 20 g/l are added in the mixing vat. After a heating-up time of 15 minutes, the cellulose is processed to paper. A tissue which has been dyed violet and has very good fastnesses to sodium carbonate solution, acetic acid, water and alcohol is obtained.

What is claimed is:

1. A disazo dyestuff of the formula (I)

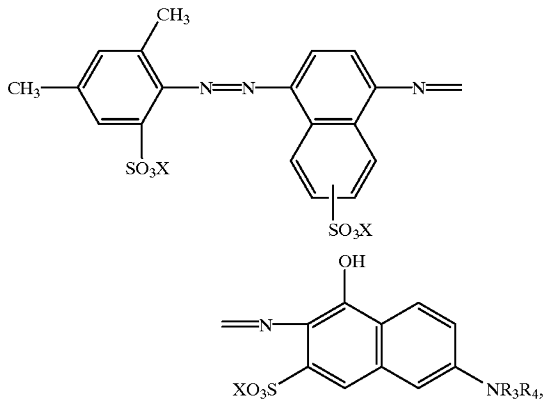

in which $R_3$ represents hydrogen or $C_1$–$C_4$-alkyl, $R_4$ represents hydrogen, $C_1$–$C_4$-alkyl, optionally substituted phenyl or acyl, X represents identical or different alkali metal ions of lithium, potassium ions, and cations of organic amines of mono-, bis-, tris-, and tetra-$C_1$–$C_4$-alkylammonium ions, mono-, bis-, and tris-$C_1$–$C_4$-alkanolammonium ions or mixed forms thereof.

2. A dyestuff as claimed in claim 1, wherein optionally substituted phenyl in the meaning of $R_4$ represents phenyl which is substituted one to four times by identical or different substituents of $C_1$–$C_4$-alkyl, $C_1$–$C_4$-alkoxy, halogen, sulfo, carboxyl, hydroxyl, amino, amino which is mono- or disubstituted by $C_1$–$C_4$-alkyl, acylamino, $C_1$–$C_4$-alkanoylamino, benzoylamino or benzoylamino which is substituted by $C_1$–$C_4$-alkyl, $C_1$–$C_4$-alkoxy, clorine or bromine, and wherein acyl in the meaning of $R_4$ represents aminocarbonyl, formyl, $C_1$–$C_4$-alkanoyl, benzoyl or benzoyl which is substituted by $C_1$–$C_4$-alkyl $C_1$–$C_4$-alkoxy, chlorine or bromine.

3. A dyestuff as claimed in claim 1, wherein X represents H, $R_3$ represents H and $R_4$ represents phenyl.

4. An aqueous dyestuff solution comprising at least one dyestuff of the formula (I) of claim 1, in which X is identical or different and represents a lithium ion or represents a cation of the formula $$R_5—\overset{\oplus}{N}(R_6)_3,\quad R_5—\overset{\oplus}{N}H(R_6)_2 \text{ or } (R_5)_2\overset{\oplus}{N}H—R_6,$$

in which $R_5$ represents hydrogen or $C_1$–$C_4$-alkyl which is optionally substituted by hydroxyl or hydroxy- $C_1$–$C_4$-alkoxy, $CH_3$, $C_2H_5$, $CH_2$—$CH_2$—$CH_3$, $CH_2$—$CH_2$—$OH_2$—$CH(OH)$—$CH_3$ or $CH_2$—$CH_2$—$OCH_2$—$CH_2$—OH, and $R_6$ represents $C_1$–$C_4$-hydroxyalkyl, $C_1$–$C_4$-hydroxyalkoxy-$C_1$–$C_4$-alkyl or hydroxy-poly ($C_1$–$C_4$-alkoxy)-$C_1$–$C_4$-alkyl having up to 6 $C_1$–$C_4$-alkoxy units, $CH_2$—$CH_2$—OH, $CH_2$—CH(OH)—$CH_3$, $CH_2$—$CH_2$—$OCH_2$—$CH_2$—OH or

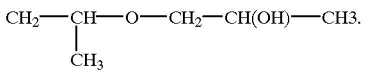

5. An aqueous dyestuff solution as claimed in claim 4, in which

X is identical or different and represent a cation of the formula $$R_5\text{—}\overset{\oplus}{N}H(R_6)_2 \quad \text{or} \quad (R_5)_5\overset{\oplus}{N}H\text{—}R_6.$$

6. An aqueous dyestuff solution as claimed in claim 4, having a dyestuff content of 5 to 40% by weight.

7. An aqueous dyestuff solution as claimed in claim 4, in which $R_5$ represents $CH_3$, $C_2H_5$, $CH_2$—$CH_2$—$CH_2$—$CH_3$, $CH_2$—$CH_2$—$OH_2CH(OH)$—$CH_3$ or $CH_2$—$CH_2$—$OCH_2$—$CH_2$—OH.

8. An aqueous dyestuff solution as claimed in claim 4, in which $R_6$ represents

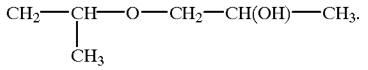

9. A process for the preparation of a dyestuff as claimed in claim 1, comprising diazotizing an aminobenzenesulfonic acid of the formula (III)

(III)

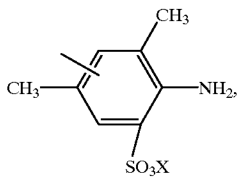

and coupling the diazotization product to an aminonaphthalenesulfonic acid of the formula (IV)

(IV)

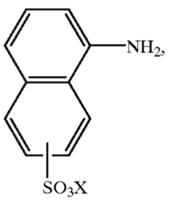

to form an aminoazo dyestuff, diazotizing the aminoazo dyestuff formed in this reaction to form a diazotization product, of the formula (V)

(V)

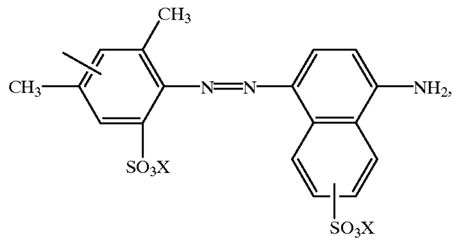

and coupling the diazotization product to an aminonaphthalenesulfonic acid of the formula (VI)

(VI)

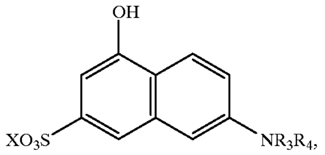

in which $R_3$ and $R_4$ have the meaning given in claim 1.

10. A process as claimed in claim 9, wherein the aminobenzenesulphonic acid of formula III is 2-amnino-3,5-dimethyl-benzenesulfonic acid.

11. A process as claimed in claim 9, wherein the aminonaphthalenesulphonic acid of formula IV is 1-aminonaphthalene6- or -7-sulfonic acid.

12. A process as claimed in claim 9, wherein the aminonaphthalenesulphoric acids of formula VI are at least one of 1-hydroxy-7-amino-, -7-methylamino-, -7-dimethylamino-, -7-phenyiamino, 7-(4-sulfophenylisino)-, -7(3-sulfophenylamino)-, -7-(4-carboxyphenylainino)-, -7-(3-caxboxyphenylardino)-, -7-(4-hydroxy-3-boxyphenylamino)-, -7-(4-methylphenylamino)-, -7-(4-methoxyphenylamino)-, -7-(2-methoxyphenylamino)-, -7-(2,4-dimethoxyphenylamino)-, -7-(4-chlorophenylammo)-, -7-(4aminophenylamino)-, -7-(4-amino-3-sulfophenylamino)-, -7-(4-benzoylaminophenylamino)-, -7-(4-benzoylemino-3-sulfophenylamino)-, -7-(4-4'-methylbenzoylamnophenylamino)-, -7-ureido-, -7-acetamino-, -7-benzoylamino- and -7-(4-methylbenzoylamino)-naphthalenc-3-sulfolic acid.

13. A process for the preparation of a dyestuff solution which comprises converting at least one dyestuff of the formula (I)

(I)

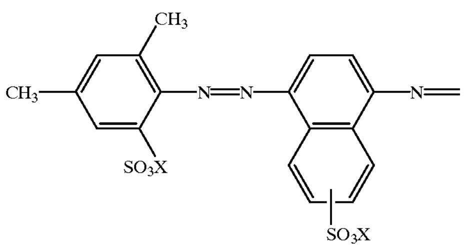

-continued

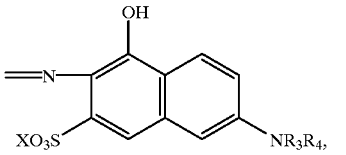

in which $R_3$ represents hydrogen or $C_1$–$C_4$-alkyl, $R_4$ represents hydrogen, $C_1$–$C_4$-alkyl, optionally substituted phenyl or acyl, X represents a sodium, with an amount of calcium ions at least equivalent to the sulfo groups into a sparingly soluble dyestuff of formula (I) where $X=\frac{1}{2}Ca^{2+}$, separating off this dyestuff and then carrying out a salt-to-salt conversion by stirring in water with a) a 0.5- to 2-fold, based on the calcium ions, of at least one sulfate selected from the group consisting of $Li_2SO_4$, $(NH_4)_2SO_4$, $[R_5{}^-N^+(R_6)_3]_2SO_4$, $[R_5{}^-N^+H(R_6)_2]_2SO_4$ and $(R_5)_2N^+-R_6]_2SO_4$ or b) a 0.5- to 2-fold, based on the calcium ions, of sulfric acid and an amount which is at least equivalent to the sufliric acid of at least one compound selected from the group consisting of basic lithium salts, ammonia and ammonium hydroxides of the formula $R_5{}^-N^+(R_6)_3{}^-OH$ and/or an up to 100% excess, relative to the equivalent amount of sulmiric acid, of an amine selected from the group consisting of $R_5$—$N(R_6)_2$ and $(R_5)_2N$—$R_6$ and separating off, by filtration, the calcium sulfate which has precipitated out from the dyestuff solution thus obtained.

14. A process as claimed in claim 13, wherein the sulfuric acid is used in an amount of from 0.6 to 1.2-fold excess.

15. A process as claimed in claim 13, wherein the amine is used in an excess of from 12.5 to 75%.

16. A process for dyeing and printing materials containing carboxamide groups or cellulosic materials comprising applying thereto an effective amount of a dyestuff as claimed in claim 1.

17. A process for dyeing and printing paper or leather comprising applying thereto an effective amount of a dyestuff as claimed in claim 1.

18. A process for dyeing and printing paper in the pulp or in the surface comprising applying thereto an effective amount of a dyestuff as claimed in claim 1.

19. Paper in the pulp or on the surface, leather, and printing materials containing carboxamide groups or cellulosic materials dyed or printed with the dyestuff of claim 1.

* * * * *